(12) United States Patent
Bernard et al.

(10) Patent No.: US 7,310,908 B2
(45) Date of Patent: *Dec. 25, 2007

(54) INSECT BAIT STATION

(76) Inventors: Alan S. Bernard, 8885 SW. 7th St., Boca Raton, FL (US) 33488; Michael Anthony, 10189 West Sample Rd., Coral Springs, FL (US) 33065

( * ) Notice: Subject to any disclaimer, the term of this patent is extended or adjusted under 35 U.S.C. 154(b) by 0 days.

This patent is subject to a terminal disclaimer.

(21) Appl. No.: 11/093,200

(22) Filed: Mar. 29, 2005

(65) Prior Publication Data

US 2005/0198893 A1    Sep. 15, 2005

Related U.S. Application Data

(63) Continuation-in-part of application No. 10/679,828, filed on Oct. 6, 2003, now Pat. No. 6,871,444.

(51) Int. Cl.
*A01M 1/20* (2006.01)

(52) U.S. Cl. ........................................................ 43/131

(58) Field of Classification Search .................... 43/131
See application file for complete search history.

(56) References Cited

U.S. PATENT DOCUMENTS

| | | | | |
|---|---|---|---|---|
| 5,396,730 A | * | 3/1995 | VanGundy et al. ........... | 43/131 |
| 5,548,922 A | * | 8/1996 | Wefler .......................... | 43/131 |
| 5,746,019 A | * | 5/1998 | Fisher ............................. | 43/1 |
| 5,983,558 A | * | 11/1999 | Las et al. ..................... | 43/131 |
| 6,195,933 B1 | * | 3/2001 | Woodruff ...................... | 43/131 |
| 6,216,384 B1 | * | 4/2001 | Dickson et al. ............... | 43/131 |
| D451,573 S | | 12/2001 | Clark, III | |
| 6,532,696 B2 | * | 3/2003 | Clark et al. ................... | 43/131 |
| 6,553,712 B1 | * | 4/2003 | Majerowski et al. .......... | 43/131 |
| 2003/0145511 A1 | * | 8/2003 | Finn et al. .................... | 43/131 |

\* cited by examiner

*Primary Examiner*—Kurt Rowan
(74) *Attorney, Agent, or Firm*—Mark D. Bowen, Esq.; Stearns Weaver Miller Weissler Alhadeff & Sitterson, P.A.

(57) ABSTRACT

A user activated insect bait station particularly adapted for use with a flowable bait, including attractants and toxicants is disclosed. The bait station is formed as a sealed container fabricated from two primary parts, an upper portion and a lower portion sealingly connected along common peripheral edges. The bait station includes first and second chambers in fluid communication for containing the bait. The user forms an opening in the bait station to expose the bait in the first chamber to the atmosphere while providing access to the bait for ants. The bait station further defines a recessed groove that provides a pathway leading to the second chamber opening. A top cover is provided for shielding the bait station opening while providing access to the opening.

8 Claims, 12 Drawing Sheets

INSECT BAIT STATION

CROSS REFERENCE TO RELATED APPLICATIONS

This application is a Continuation-In-Part of U.S. patent application Ser. No. 10/679,828, filed Oct. 6, 2003, now U.S. Pat. No. 6,871,444 which is incorporated hereby by reference.

STATEMENT REGARDING FEDERALLY SPONSORED RESEARCH OR DEVELOPMENT

Not Applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to devices for use in exterminating pests, and more particularly to an insect bait station that holds a liquid, gel, or granular insecticide or pesticide in a sealed configuration prior to use, but is easily opened by a user to an unsealed configuration whereby the enclosed bait is exposed to insects and other pests.

2. Description of the Background Art

Human populations have long encountered problems co-existing with various insects, particularly ants. There are more than ten thousand species of ants, a number of which infest structures, lawns, parks, and other areas frequented by humans. The various species of ants vary widely in many respects including size, color, shape, distribution, food preference, and nest locations. Many other species of ants routinely disrupt activities in homes, offices, and parks. As a result, controlling insect populations is therefore necessary.

A primary means of pest control involves the use of toxicants, particularly liquid poison. The spraying of liquid poison is a common method of pest control. Spraying liquid poison, however, involves a number of inherent disadvantages. A primary disadvantage involves the risk of exposing humans to the toxic chemical formulations. Furthermore, spraying poison is often harmful to the environment and often causes damage to vegetation and other animal species in addition to the targeted pest population. In addition, liquid poison that has been applied by spraying often degrades over time and/or is washed away by rain or irrigation water thereby reducing effectiveness and requiring repeated treatment and/or the use of greater quantities.

For these and other reasons it has been found preferable to contain liquid or gel toxicants in bait stations, which stations provide structures that contain the poison while providing access to insects.

The background art reveals a number of attempts directed to pest control. The following patents provide examples of these attempts.

| | |
|---|---|
| 4,648,201 | Sherman |
| 4,782,621 | Wissman |
| 4,793,093 | Gentile |
| 4,823,506 | Demarest et al. |
| 4,841,669 | Demarest et al. |
| 5,446,992 | Stewart |
| 5,501,033 | Wefler |
| 5,775,026 | Pearce et al. |
| 5,802,761 | Demarest et al. |
| 5,875,586 | Ballard et al. |
| 5,943,816 | Hyatt et al. |
| 5,943,817 | Miller |
| 5,953,854 | Hyatt |
| 5,983,558 | Las et al. |
| 6,041,542 | Payton et al. |
| 6,189,259 | Soller |
| 6,195,933 | Woodruff |
| 6,216,384 | Dickson et al. |
| 6,532,696 | Clark III, et al. |

U.S. Pat. No. 4,793,093, issued to Gentile, discloses a feeding station for vermin that allows for ingress of the vermin to feed on poisoned bait held at a central portion therein. The bait is contained within a central well and ingress is facilitated by an inclined ramp leading to the chamber. A cover is joined to the top of the base member to cover the central well holding the poisoned bait.

U.S. Pat. Nos. 4,823,506 and 4,841,669, issued to Demarest et al., each disclose an insect bait device for exterminating crawling insects. The devices comprise first and second housing portions joinable to form a housing that defines generally unobstructed entry into the device by an insect. U.S. Pat. No. 5,802,761, also issued to Demarest et al., discloses a bait station including a base defining a bait-cup and a cover fastened to the base. The cover and base cooperate to form a door and walkway to admit targeted insects to enter the bait station thus gaining access to the bait cup.

U.S. Pat. No. 5,501,033, issued to Wefler, discloses a liquid delivery bait station having two reservoirs and fluid transfer systems to allow sequential delivery of two liquids. The liquids are preferably an insect attractant that is first delivered into an absorbent feeding pad and an insect toxicant that is next delivered to the absorbent pad.

U.S. Pat. No. 5,775,026, issued to Pearce et al., discloses an insect bait station for attracting and killing insects that comprises a substantially flat configuration with insecticide formulated as a solid coating on the surface of a sheet of moisture free material, and one or more breakable ampoules containing an attractant composition. The ampoules are held in a compressible portion of the housing permitting them to be manually broken to discharge their contents on command thereby releasing attractant vapors.

U.S. Pat. No. 5,875,586, issued to Ballard et al., discloses a refillable liquid bait station formed to allow access by insects, but not by larger animals. The bait station includes a transparent housing that protects the liquid bait from wind and rain and which further prevents leakage if the bait station is tumbled and/or placed in an incorrect position by use of a series of inner walls and chambers.

U.S. Pat. No. 5,943,816, issued to Hyatt et al., discloses an insect bait station for delivering a liquid toxicant. The bait station includes a reservoir, a feeding disk with capillary feeding pores, and a base that seals the feeding pores when configured in a closed position. U.S. Pat. No. 5,953,854, also issued to Hyatt, discloses a spill resistant granular bait station having a tunnel entrance leading to an interior bridged member having an inner wall leading from the bottom surface to an inner surface having an access opening in the bridge member leading to a bait source contained within the station. A cover defines a recessed portion thereon closely cooperating with the access opening in the base.

U.S. Pat. No. 6,041,542, issued to Payton et al., discloses a spill-resistant liquid bait station for dispensing liquid bait. The liquid bait is contained in a reservoir at the bottom of the bait station base and a lid is secured over the end of the base. The interior of the bait station is configured for containing the liquid bait if the bait station is inverted. Insects enter the bait station through one or more access ports and then travel through an interior passageway to the liquid bait.

U.S. Pat. No. 6,189,259, issued to Soller, discloses an insect bait-and-switch liquid delivery apparatus for the control of insects. The apparatus includes a reservoir defining a first chamber containing a liquid attractant and a second chamber containing a liquid toxicant. A first feeding station is provided in the first chamber and a second feeding station is provided in the second chamber. A passageway connects the first and second chambers, and an access port is disposed to initially prevent or limit access of an insect to the second feeding station during an initial feeding period and the subsequently enable access to the second feeding station via the passageway after the initial feeding period.

U.S. Pat. No. 6,195,933, issued to Woodruff, discloses a bait station for delivery of liquid insecticide formed from a base having at least one feeding station and a reservoir for storing liquid beneath the base. The insecticide is transferred by capillary action from the reservoir to the feeding station via a connecting tube.

U.S. Pat. No. 6,216,384, issued to Dickson et al., discloses an insect bait station having a continuous outer wall leading from a base to an upper annular surface having a central axial recessed opening therein leading down to a bait source contained in the interior of the station. The interior of the station defines an inverted conical concave part for concentrating the bait to the lowest point of the cone in proximity with an opening in the bottom of the central axial recessed opening.

U.S. Pat. No. 6,532,696, issued to Clark III, et al., discloses a holder for liquid insect bait comprising a sealed container having a bottom portion defining contours that form reservoirs and channels wherein liquid bait may be located and flow. The device is deployed by orienting the device in a vertical configuration whereby the liquid bait flows to specified internal reservoirs, cutting an entrance opening in the container at a specified location, and placing the container in a horizontal configuration wherein the liquid bait flows to additional reservoirs accessible to the insects.

The insect bait stations of the prior art are burdened with a number of significant limitations, including the failure to disclose a liquid insect bait station that is sealed during storage, shipping, and transit, but is readily activated by the user.

BRIEF SUMMARY OF THE INVENTION

The present invention provides an insect bait station particularly adapted for use with liquid insecticides and pesticides. The insect bait station is fabricated as a sealed container that houses a liquid insecticide or pesticide sealed therein. The bait station is formed as a sealed container fabricated from two primary parts, an upper portion and a lower portion sealingly connected along common peripheral edges. The lower portion is generally planar and provides a flat bottom surface or base for orienting the bait station on a horizontal supporting surface. The upper portion defines a surface forming a generally conical shape with a truncated top. More particularly, the upper portion defines radially inner and outer raised surfaces arranged in a generally concentric configuration. The raised outer surface defines an interior chamber that functions as a liquid bait reservoir wherein the liquid bait is stored. The raised inner surface defines an interior chamber that is partially filled with liquid bait. Upon opening the top of the raised inner surface a bait filled chamber having a generally axially disposed entrance is formed. By exposing only a small surface area of the liquid bait to the atmosphere evaporative loss is minimized thereby maximizing the effective life of the apparatus. The device further includes a recessed groove that substantially bisects the apparatus by traversing the outer and inner raised surfaces thereby forming a recessed pathway to guide insects from the peripheral edge of the apparatus to an opening formed by the user at the inner raised surface. The opening provides insects with access to the bait which preferably comprises a liquid insecticide or pesticide including an attractant and a toxicant contained within the apparatus, while exposing a relatively small surface area to the atmosphere so as to maximize the effectiveness of the apparatus by minimizing evaporation. In an alternate embodiment, a cover is provided to further minimize evaporation while maintaining insect access to the liquid insecticide.

Accordingly, it is an object of the present invention to provide an improved insect bait station.

Still another object of the present invention is to provide a spill resistant liquid insect bait station.

Another object of the present invention is to provide a liquid insect bait station wherein liquid bait is maintained in a reservoir with an access opening that exposes only a small surface area thereby minimizing loss of liquid bait through evaporation.

Still further objects and advantages will become apparent from a consideration of the ensuing description and drawings.

DETAILED DESCRIPTION OF THE INVENTION

Figure 1:
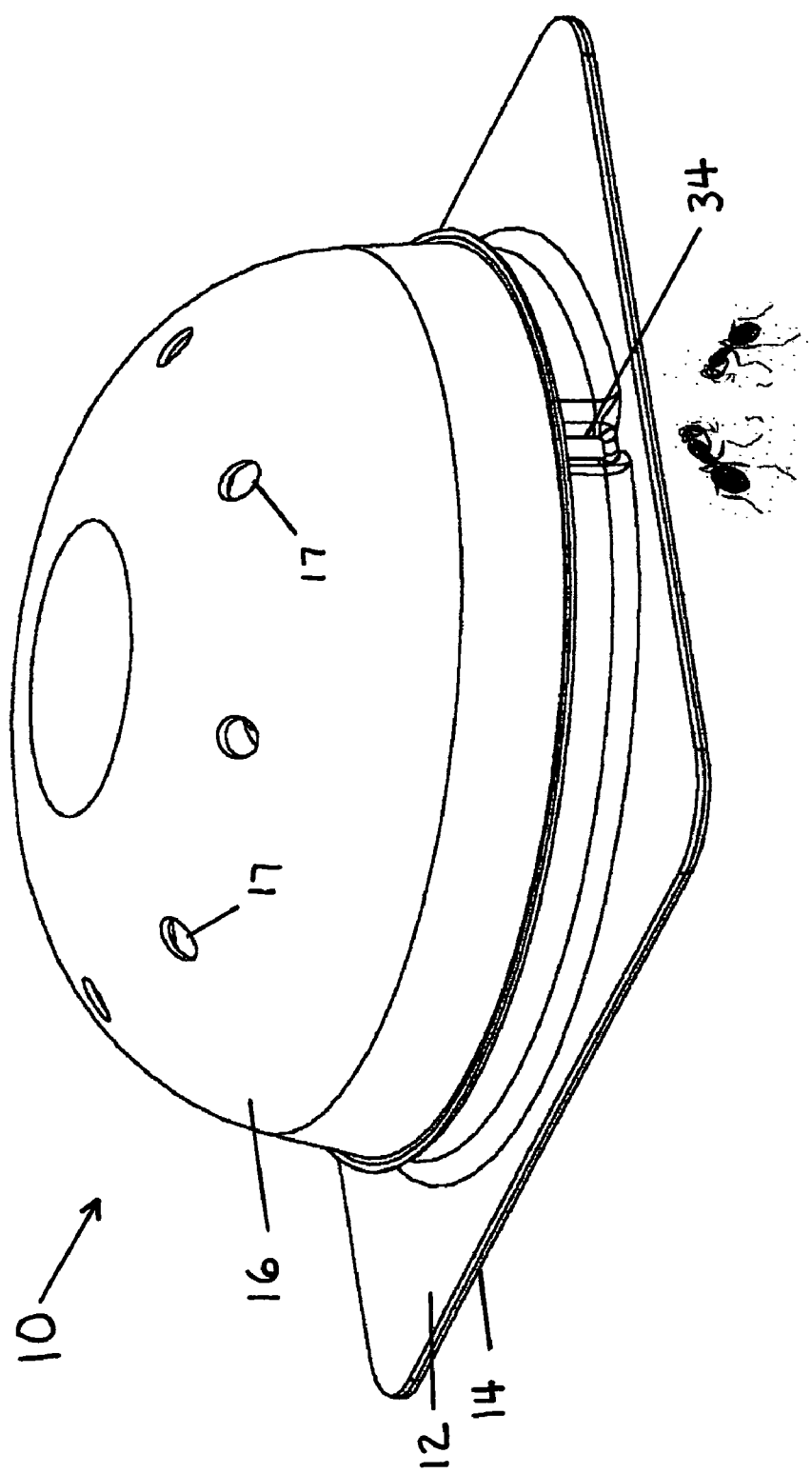
FIG. 1 is a top perspective view of an insect bait station according to the present invention.
Figure 2:
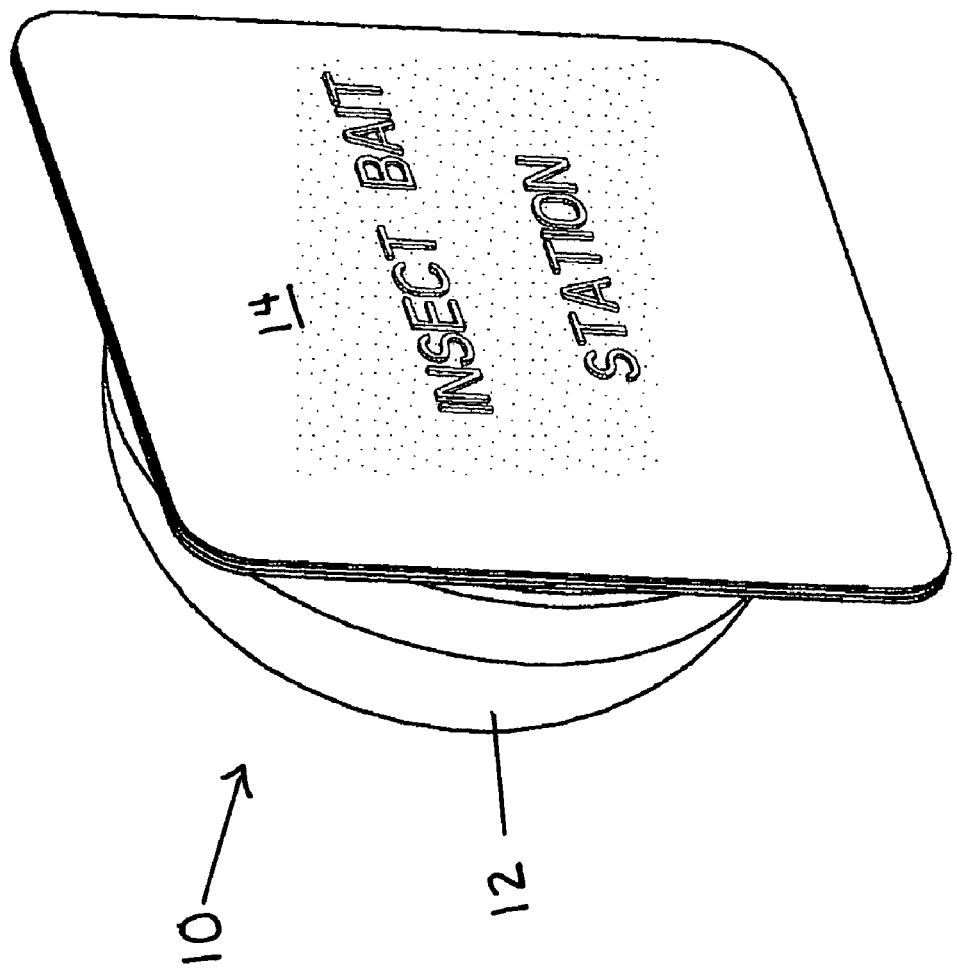
FIG. 2 is bottom perspective view thereof.

With reference now to the drawings FIGS. 1-10 depict an insect bait station, generally referenced as 10, particularly adapted for use with liquid and/or flowable gel insecticides and pesticides. Insect bait station 10 is preferably fabricated from vacuum formed plastic, however, thermal forming, stamping, injection molding, or any suitable fabrication process and material is considered within the scope of the present invention. Insect bait station 10 is formed as a sealed container fabricated from two primary parts, an upper portion 12 and a lower portion 14 sealingly connected along common peripheral edges thereby forming a peripheral seal 18 and a unitary, fluid-tight structure. Alternatively, bait station 10 may be formed as a single piece, such as by blow molding, filled with a liquid bait and then sealing the fill port. Lower portion 14 is generally planar and provides a flat bottom surface or base for orienting the bait station on a horizontal supporting surface. Bait station 10 may further include a top cover 16, however, the bait station is fully functional without the use of top cover 16. FIGS. 1-4 depict bait various views of bait station 10.

Figure 5:
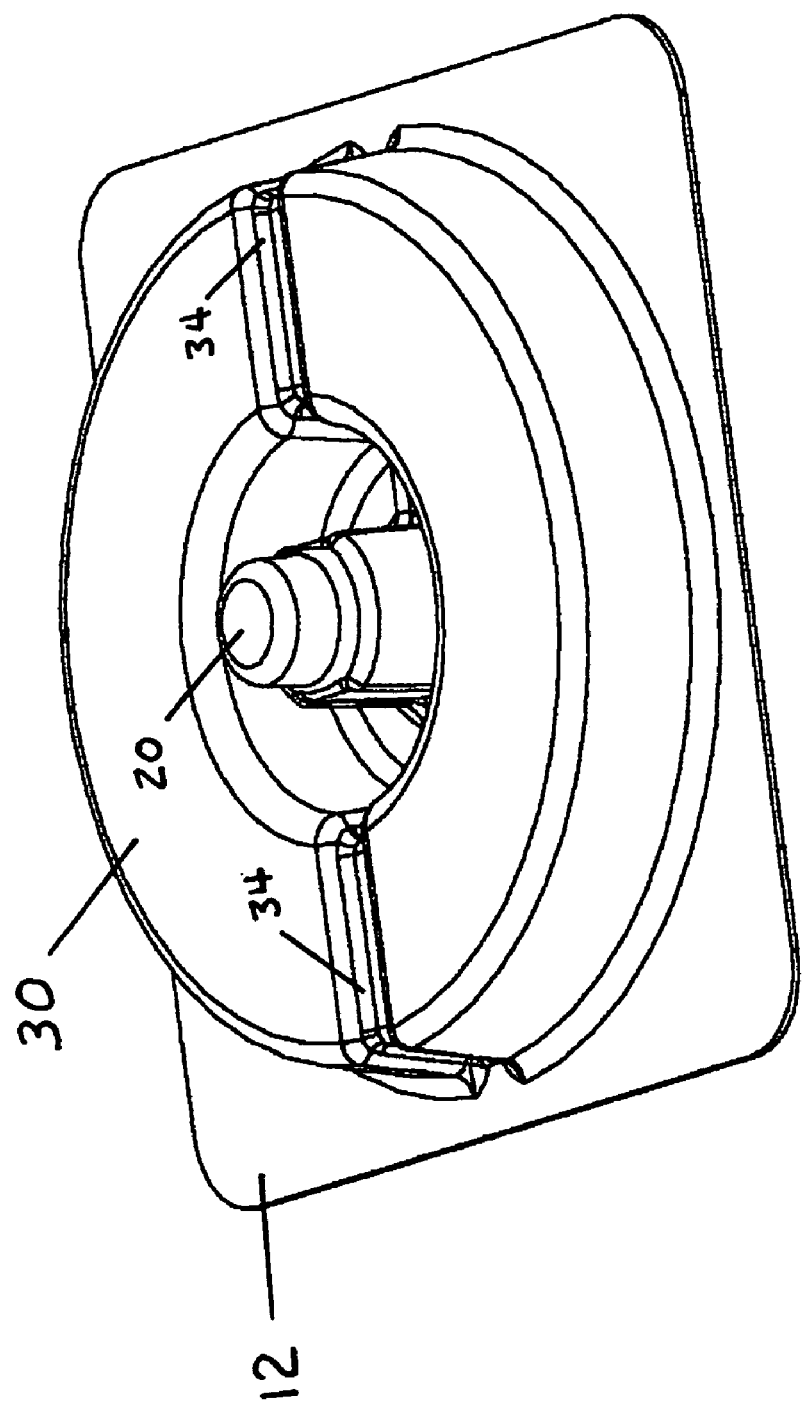
FIG. 5 is a top perspective view of the bait station upper portion.

As best seen in FIG. 5, upper portion 12 defines a surface forming a generally raised annular shape, such as a conical shape with a truncated top. It should be noted, however, that any suitable shape is considered within the scope of the present invention. In a preferred embodiment, the upper portion 12 defines concentrically disposed projecting surfaces, including a projecting inner conical structure 20 and a projecting doughnut-shaped or annular outer structure 30 in surrounding relation therewith. As depicted in FIG. 5 the inner conical and outer annular structures are generally axially aligned, however any suitable configuration is considered within the scope of the present invention. Inner conical structure 20 defines a first chamber 22 the functions as an access reservoir for insect bait, and includes a top portion 24 projecting beyond the upper edge of the outer annular structure for reasons more fully discussed herein below. As should be apparent, variations in the described structural shapes and relative positions are considered within the scope of the present invention. Accordingly, the inner conical structure 20 may be cylindrical or any other suitable shape.

Figure 6:
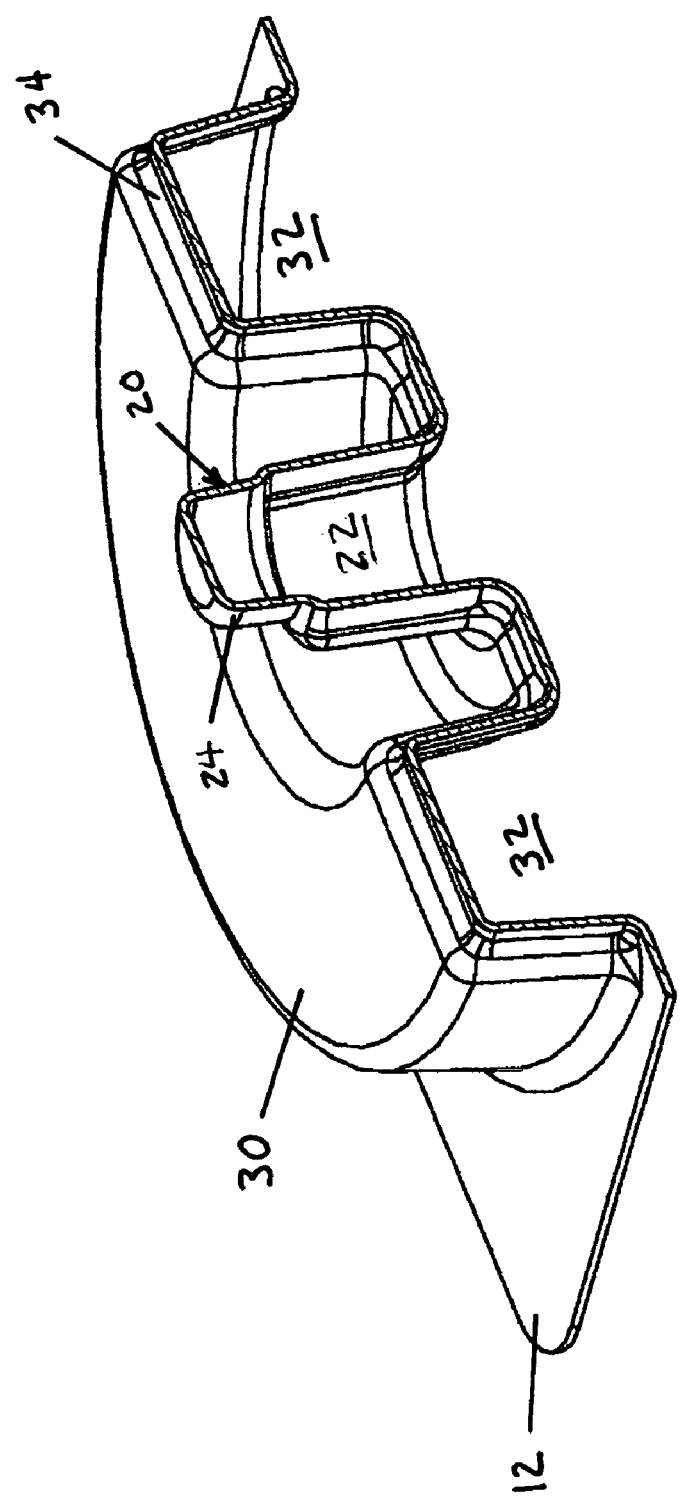
FIG. 6 is a perspective sectional view thereof.

Outer annular structure 30 defines a second chamber 32 that functions as a primary liquid bait reservoir for storing a volume of flowable insect bait 33. Second chamber 32 is bounded on the bottom by lower portion 14 and along the top and sides thereof by projecting surface 30, which forms an inverted U-shaped cross-section having circumferential inner and outer walls and a top as depicted in FIG. 6. Outer annular surface 30 defines a recessed groove 34 traversing substantially the entire upper portion 12 as best depicted in FIGS. 5-7 thereby forming a recessed pathway to guide insects from the peripheral edge of the apparatus to an opening formed by the user at the inner conical structure that leads to the first chamber.

Figure 7:
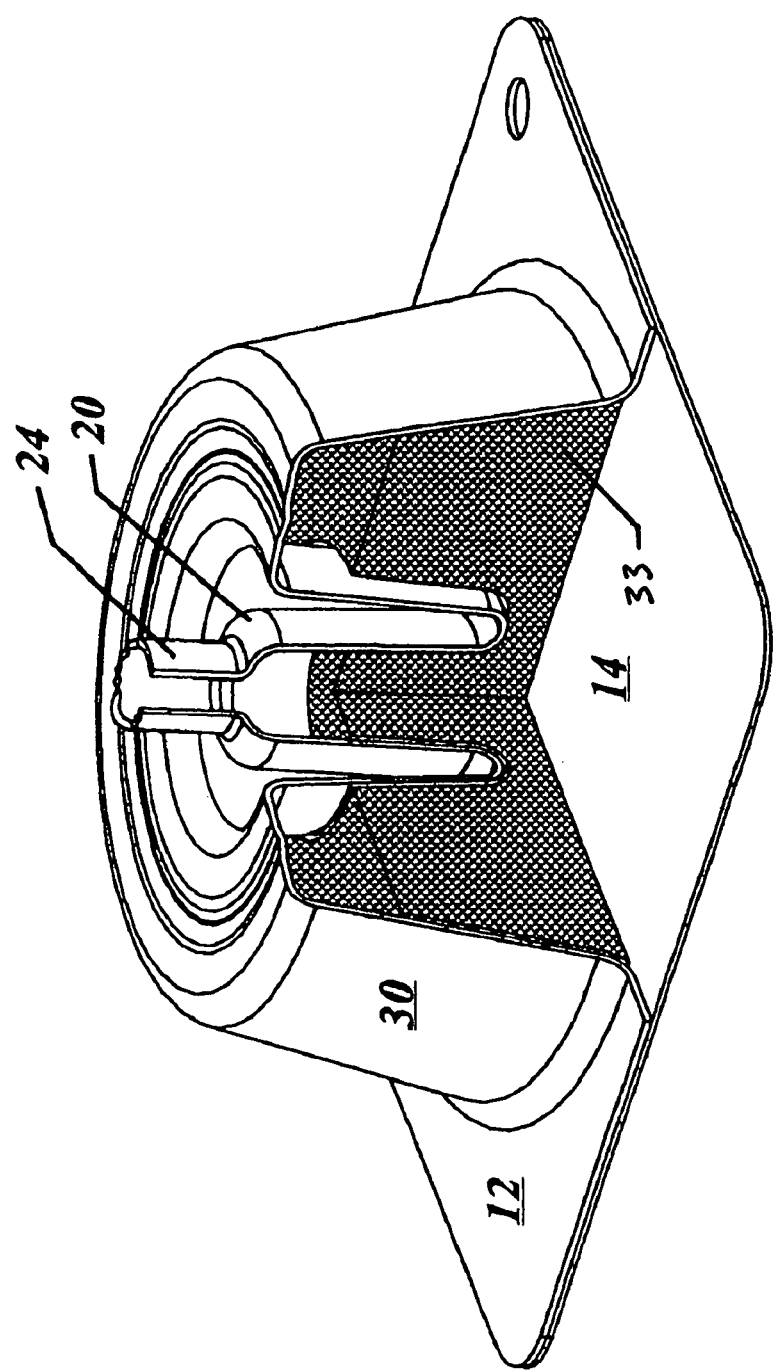
FIG. 7 is a perspective view of the complete insect bait station assembly filled with liquid insecticide.

The first chamber 22 and second chamber 32 are in fluid communication and each function to contain a flowable insecticide or pesticide, referenced as 33, prior to use as best depicted in FIG. 7. Accordingly, when bait station 10 is disposed horizontally level flowable bait contained therein will naturally seek a common level within the first and second chambers. As should be apparent, variations in the described structural shapes and relative positions are considered within the scope of the present invention. Accordingly, the outer annular structure 30 may be of any suitable shape and positioned separate from, or in any suitable position, relative to member 20. Thus, a first chamber 22 and second chamber 32 may be disposed in side-by-side relation.

A significant aspect of the present invention relates to providing a second chamber that functions as a primary reservoir for flowable insect bait in communication with a first chamber that functions as an accessible reservoir for providing insects with access to the insect bait while minimizing exposure of the bait to the evaporative effects of the atmosphere. An additional benefit of storing most of the flowable bait in a primary reservoir is that the apparatus is spill resistant as the flowable bait is substantially contained within the primary reservoir. Accordingly, should the bait station become inverted only the bait in the access reservoir defined by the first chamber will flow out. The viscosity of the flowable bait is preferably similar to water, but may be more viscous such that the bait will not rapidly flow should the apparatus become inverted thereby further rendering the bait station spill resistant.

An insect bait station according to the present invention may be fabricated by vacuum or injection molding, or any other suitable manufacturing technique. In a preferred embodiment, upper portion 12 is fabricated by vacuum molding using a suitable plastic or resin. Upper portion 12 is then inverted and chambers 22 and 32 are filled with a flowable, preferably liquid insecticide and/or pesticide. Flowable bait 33 preferably consists of: (1) an attractant, such as a food or pheromone to attract insects; and (2) a toxicant to render the insects biologically inactive. Next, while maintaining upper portion 12 inverted lower portion 14 is placed in mating engagement therewith and peripheral seal 18 is formed using heat or sonic welding techniques. As should be apparent, the disclosed configuration maintains the liquid bait within a primary bait reservoir defined by second chamber 32 and an access reservoir defined by first chamber 22, during post manufacturing packaging, storage, and shipping.

Once the user desires to deploy insect bait station for use, the user first cuts off the top portion 24 of conical structure 20 using scissors such that first chamber 22 is placed in communication with the surrounding atmosphere by forming an opening that functions as an insect access port as best depicted in FIG. 6. In an alternate embodiment, top portion 24 may be simply torn or broken off by the user. The configuration disclosed maximizes the effective life of the bait station by minimizing loss of liquid bait due to evaporation since the opening in structure 20 is relatively small and thus exposes a relatively small surface area of the bait contained within the access reservoir defined by first chamber 22 to the atmosphere. As should now be apparent, the opening created in the top portion 24 of conical structure 20 functions as an entrance allowing insects access to the enclosed bait. Bait station is preferably disposed on a horizontal supporting surface, but may be fixed to a vertical surface such as a wall by hanging the device on a nail or other projecting structure using a nail, tack, or push-pin through the base. Bait station 10 may be discarded, or refilled, when its effective life has been reached.

Figure 3:
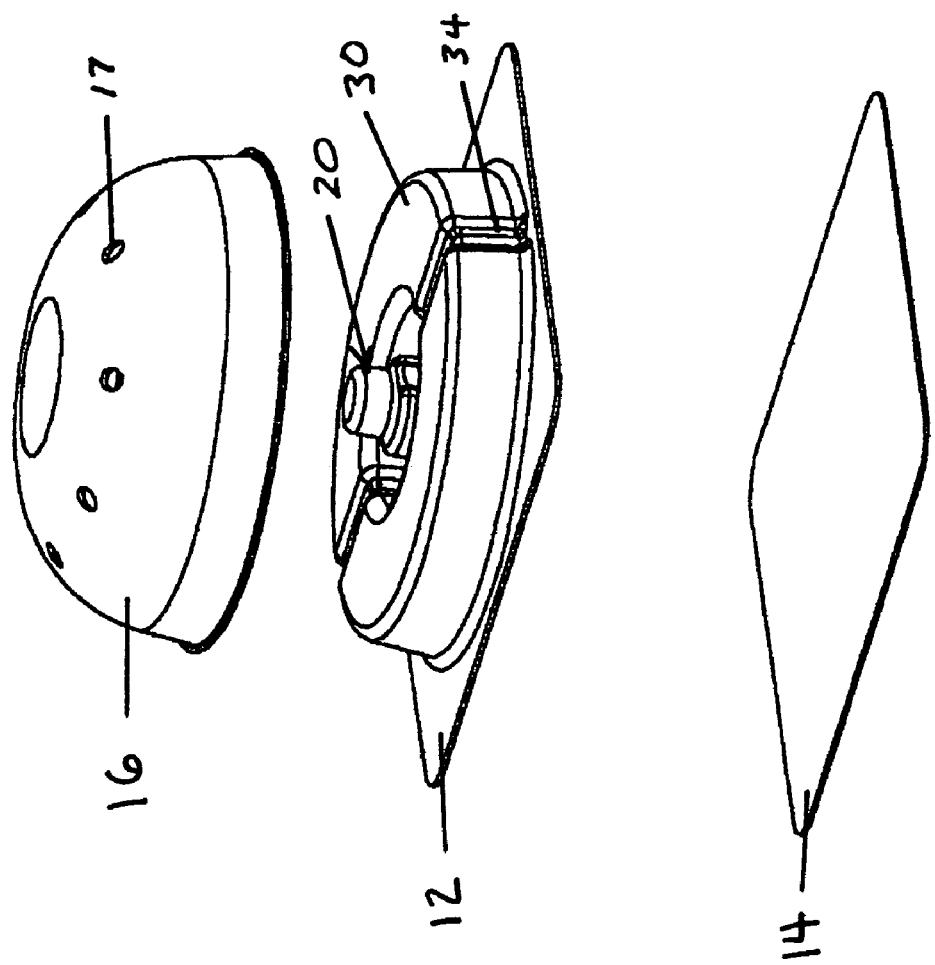
FIG. 3 is an exploded top perspective view thereof.
Figure 4:
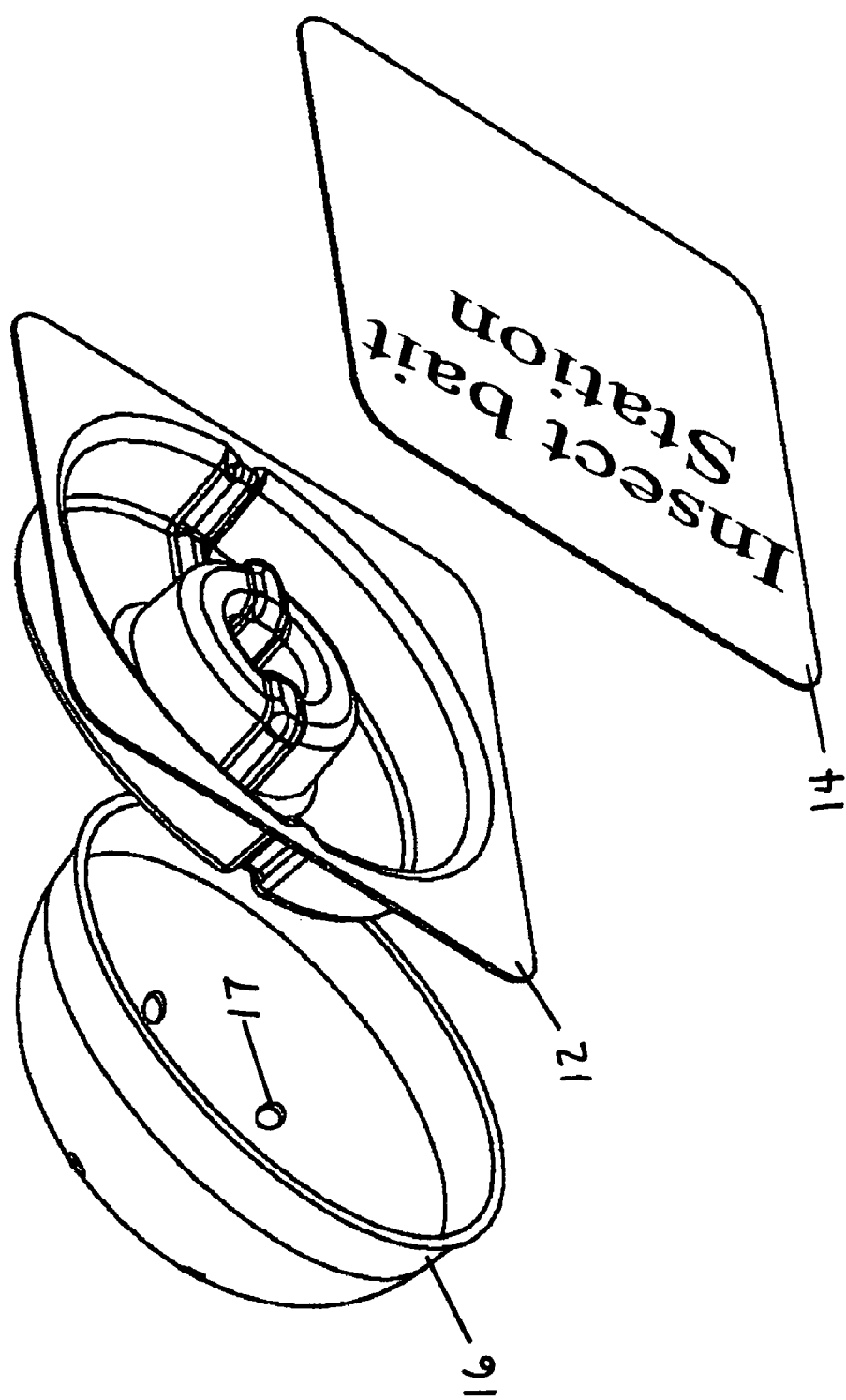
FIG. 4 is an exploded bottom perspective view thereof.
Figure 8:
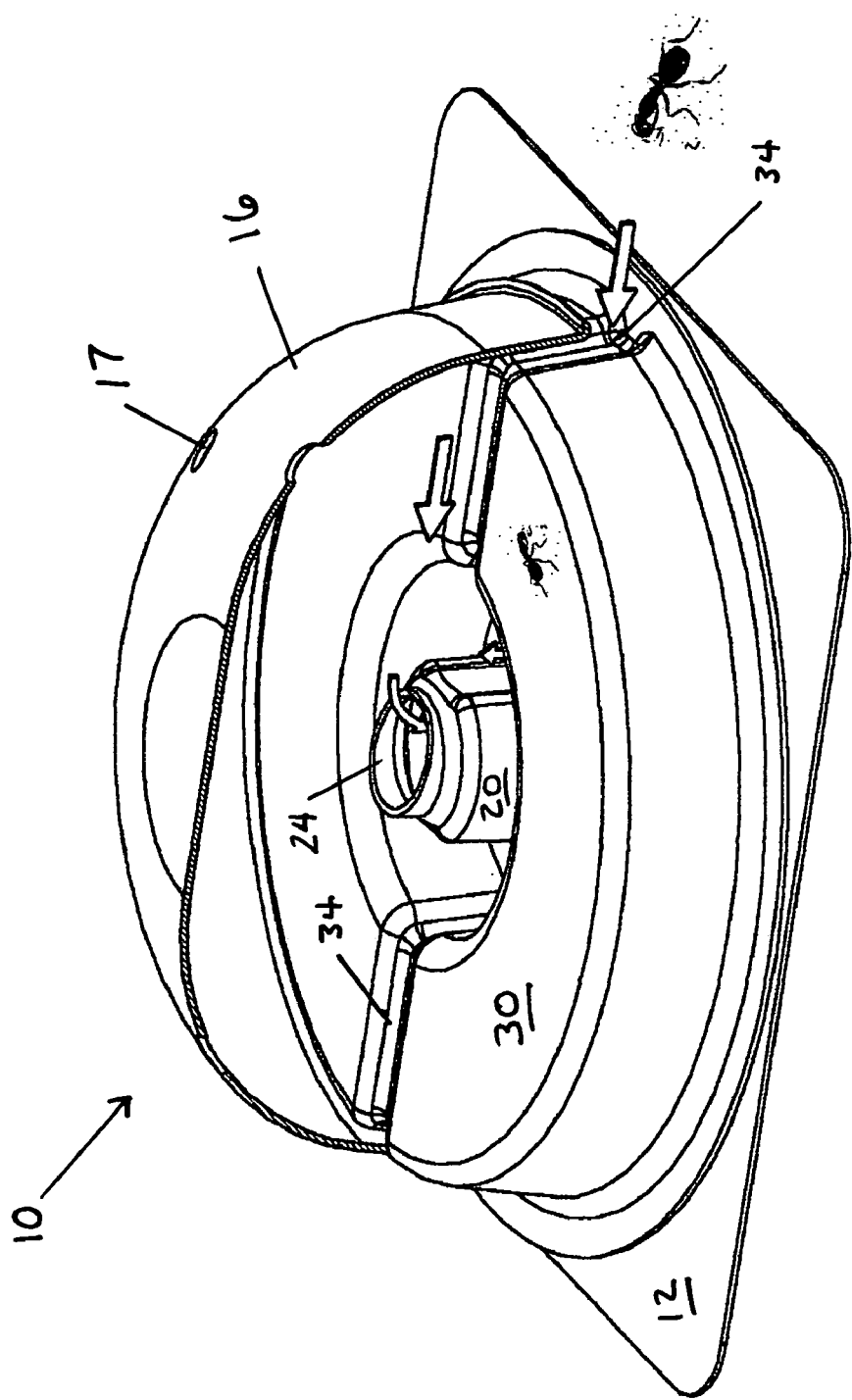
FIG. 8 is a perspective view of the insect bait station in an activated configuration with the cover depicted in sectional view.
Figure 9:
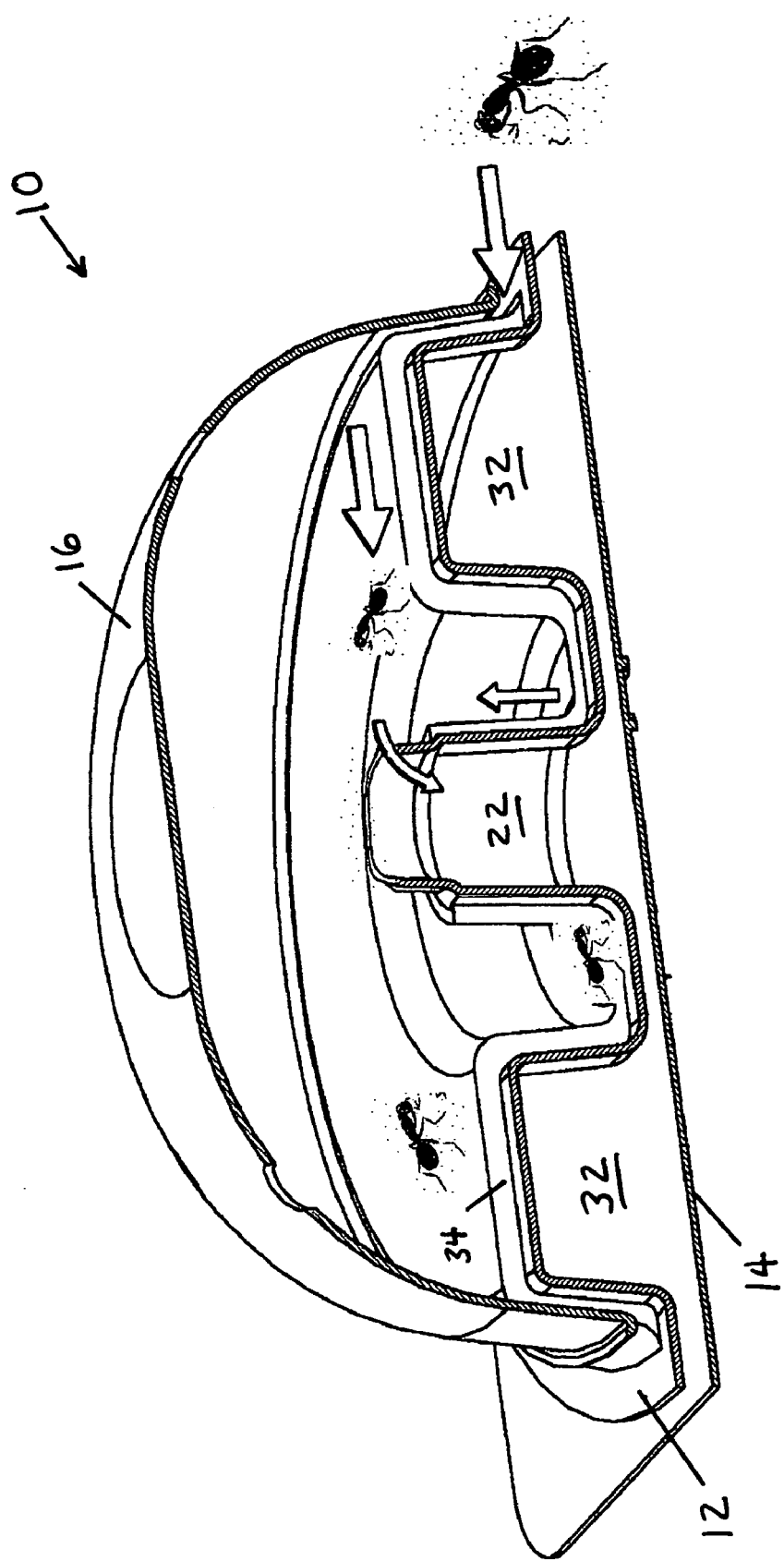
FIG. 9 is a sectional view of an the bait station in an activated configuration illustrating ants accessing the liquid insecticide via recessed pathways.
Figure 10:
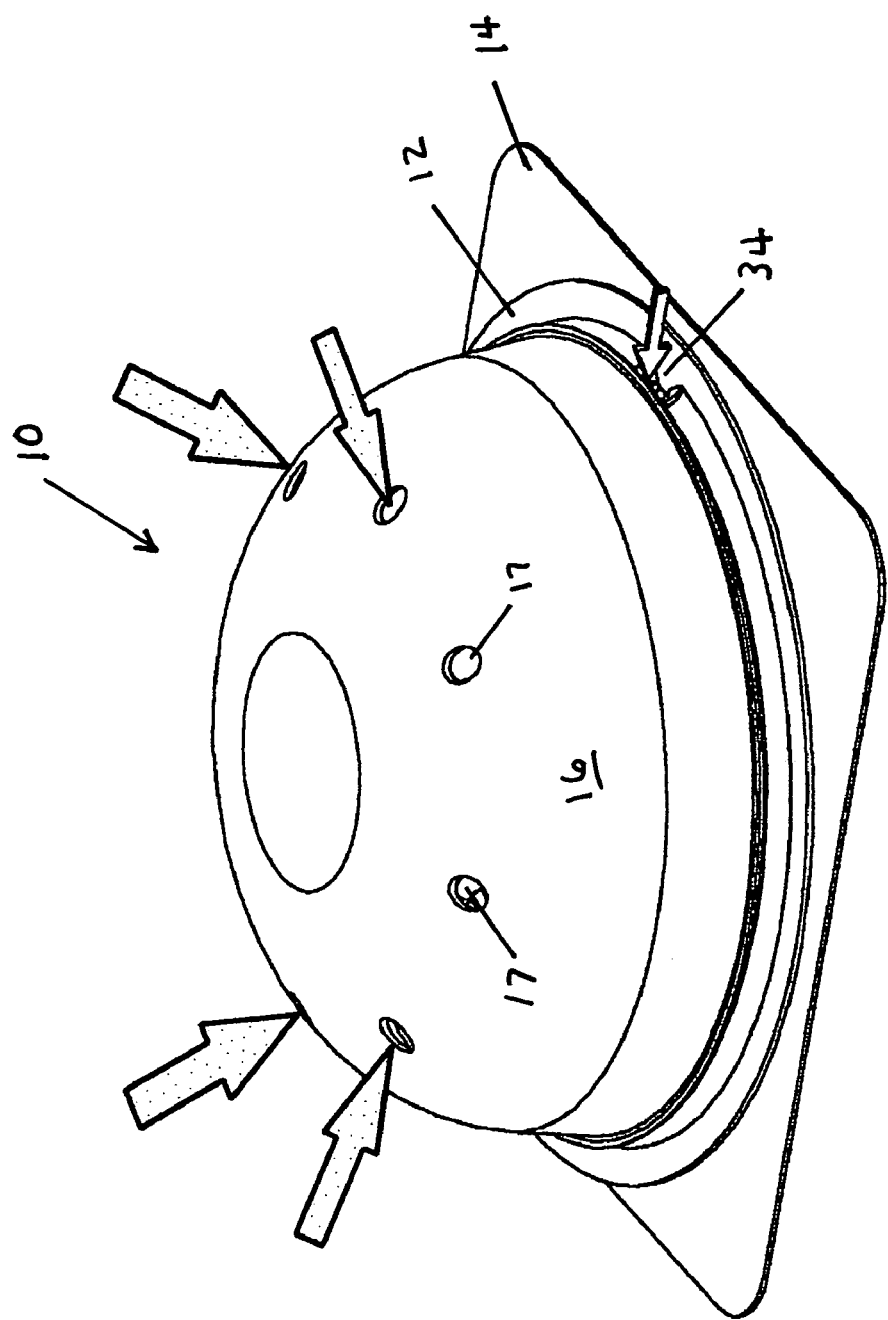
FIG. 10 is a perspective view of the insect bait station illustrating access openings.

As noted herein above, bait station 10 may further include a dome-shaped top cover 16 that is sized and shaped for mating engagement with the outer surface of the raised outer structure 30 as best depicted in FIGS. 1 and 7, and in exploded view in FIG. 3. It should be noted that top cover 16 is considered an enhancement, however, bait station 10 is operable with or with out top cover 16. Top cover 16 preferably defines a hollow, dome-shaped surface defining a generally circular open end for mating engagement with annular structure 30 in press fit engagement therewith. When installed on apparatus 10, top 16 covers the top of bait station 10, and particularly the opening in conical structure 20. Top cover 16 preferably defines a plurality of access openings therein, referenced as 17, which provide additional access to the liquid bait. Top cover 16 further maximizes the effective life of bait station 10 by limiting airflow across the opening in conical structure 20 thereby further minimizing evaporation loss. As best depicted in FIGS. 8 and 9, access to the enclosed liquid bait is maintained even with top cover 16 on by access openings provided by recessed groove 34 and top cover apertures 17. Accordingly, once bait station 10 is deployed with top cover 16 installed, insects are able to access the bait exposed in interior volume 22 of conical structure 20, by entering below the top cover via recessed groove 34 having ends on opposing sides of bait station 10, or alternatively via openings 17 in top cover 16.

Figure 11:
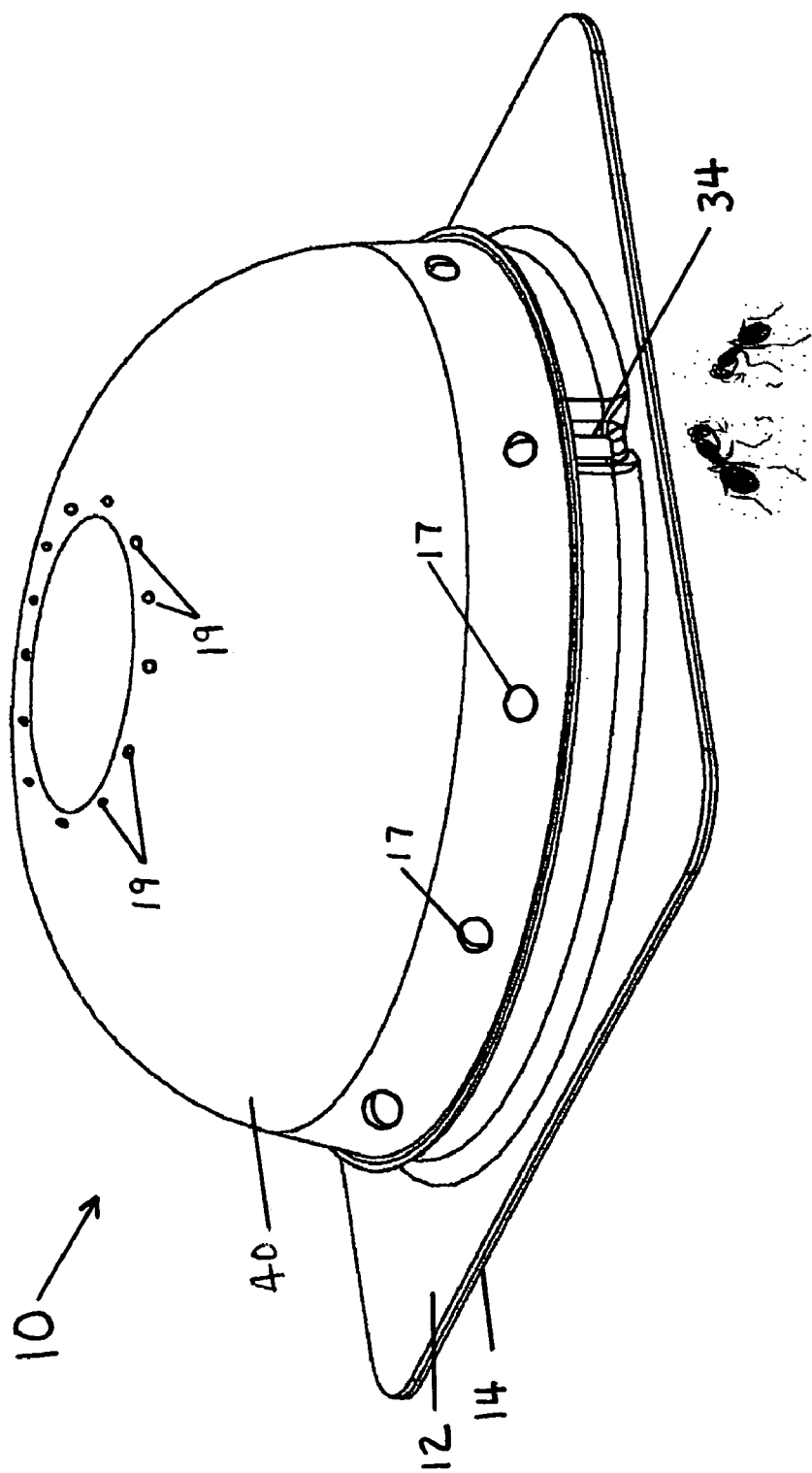
FIG. 11 depicts an insect bait station with an alternate top in accordance with the present invention.

FIG. 11 depicts an insect bait station 10 adapted with an alternate embodiment dome shaped cover, referenced as 40. Cover 40 includes a plurality of access openings 17 disposed in proximity to the lower circumferential edge thereof. Openings 17 are positioned along the lower edge to prevent rain from entering into the internal access chamber. In addition, cover 40 includes a plurality of relatively small ventilation pores, referenced as 19, disposed in proximity to the top thereof. Ventilation pores are relatively small in size such that surface tension prevents rainwater from passing through the ventilation apertures.

Figure 12:
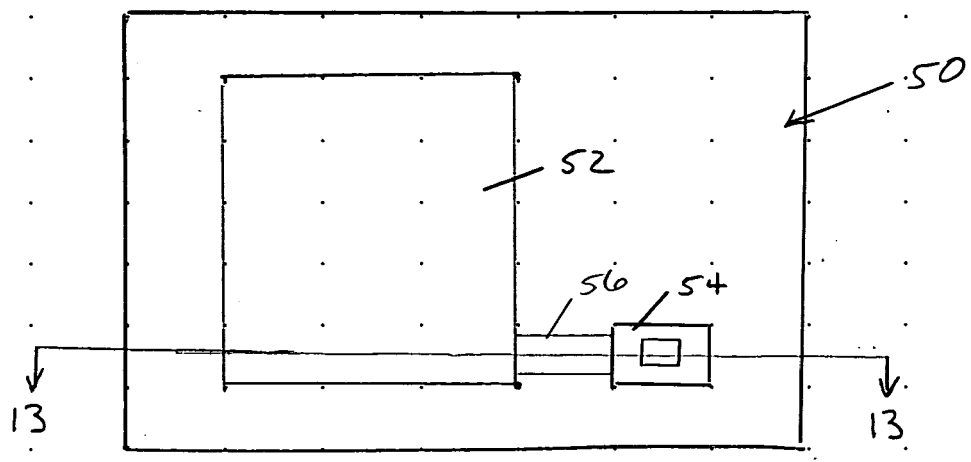
FIG. 12 is a top view of an insect bait station having an alternate configuration in accordance with the present invention.
Figure 13:
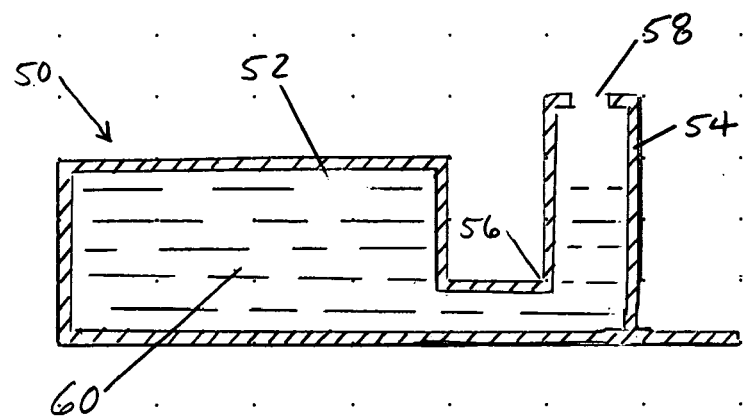
FIG. 13 is a side sectional view thereof taken along line 13-13 of FIG. 12.

FIGS. 12 and 13 depict an alternate embodiment bait station, generally referenced as 50, having a primary flowable bait chamber 52 and a secondary bait chamber 54 disposed in non-concentric adjacent relation with primary chamber 52. Secondary bait chamber 54 is in fluid communication with primary bait chamber 52, and each contain a flowable, preferably liquid, bait referenced as 60. Primary bait chamber A 52 is in fluid communication with secondary bait chamber 54 via a flow passage 56. Secondary bait chamber has a top end that is adaptable from a closed configuration wherein the chamber is substantially sealed, to an open configuration wherein an access opening 58 is formed therein to provide insects with access to the bait. Bait station 60 may further include a top cover (not shown) having the features discussed herein above. While FIGS. 12 and 13 depict a bait station having a particular geometric shape, namely rectangular, the present invention encompasses any suitable shape and configuration.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

We claim:

1. A user activated insect bait station comprising:
   a bait station body including a base, a first chamber, and a second chamber in fluid communication with said first chamber;
   said second chamber disposed in surrounding relation with said first chamber;
   a flowable insect bait contained within at least said second chamber;
   said body manually configurable from an inactivated configuration wherein said first chamber is sealed, to an activated configuration wherein said first chamber is unsealed by formation of an opening in said bait station body that exposes said first chamber; and
   said bait station body adapted with a recessed groove on the outer surface thereof, said recessed groove defining a pathway from a peripheral edge of the bait station body to said opening into which insects attain access to the insect bait contained in said first chamber.

2. A user activated insect bait station according to claim 1, further including a top cover removably connectable to said bait station body.

3. A user activated insect bait station according to claim 2, wherein said top cover includes a surface defining at least one opening therein.

4. A user activated insect bait station comprising:
   a bait station body including a base and a top sealingly connected to said base, said body defining first and second chambers in fluid communication; said first chamber functioning as a bait access reservoir and said second chamber functioning as a primary bait reservoir;
   said first and second chambers including a flowable insect bait;
   said second chamber disposed in surrounding relation with said first chamber;
   said bait station body manually configurable from an inactivated configuration wherein said first and second chambers are sealed, to an activated configuration wherein an opening is formed to said first chamber for providing insects access to bait contained therein;
   said bait station top adapted with at least one recessed groove originating at a peripheral edge of said top and traversing at least a portion thereof, said recessed groove defining a pathway from proximal the peripheral edge of the bait station body to the opening to said first chamber.

5. A user activated insect bait station according to claim 4, further including a cover removably attachable to said bait station top.

6. A user activated insect bait station according to claim 5, wherein said top includes a surface defining at least one aperture.

7. A user activated insect bait station comprising:
   a fluidly sealed bait station body having an upper portion and a generally planar lower portion;
   said bait station body including first and second internal chambers in fluid communication;
   said first chamber having an openable access port;
   a flowable insecticide bait disposed within said first and second chambers;
   said second chamber disposed in surrounding relation with said first chamber;
   said bait station manually configurable from an inactivated configuration wherein said first and second chambers are sealed, to an activated configuration wherein an access port is formed to said first chamber thereby exposing said bait to the atmosphere;
   said bait station body adapted with an a recessed groove forming an external insect guide on the outer surface thereof, the external insect guide defining a pathway bisecting said bait station body from proximal the peripheral edge of the bait station body to said insect access port into which insects attain access to the insect bait contained in said first chamber, whereby the insect guides assist an insect when the insect is searching for the access opening; and
   a top cover removably attached to said bait station body in covering relation with at least said first chamber access port.

8. A user activated insect bait station according to claim 7 wherein said top cover defines at least one opening therein.

* * * * *